United States Patent
Lobo

(10) Patent No.: US 9,103,421 B2
(45) Date of Patent: Aug. 11, 2015

(54) ROTARY-TO-LINEAR MOTION ACTUATOR HAVING A HELICAL BEVEL GEAR AND METHOD OF USE THEREOF

(71) Applicant: Mark A. Lobo, Tulsa, OK (US)

(72) Inventor: Mark A. Lobo, Tulsa, OK (US)

(73) Assignee: Lobo Engineering PLC, Tulsa, OK (US)

( * ) Notice: Subject to any disclaimer, the term of this patent is extended or adjusted under 35 U.S.C. 154(b) by 156 days.

(21) Appl. No.: 13/895,938

(22) Filed: May 16, 2013

(65) Prior Publication Data

US 2014/0338475 A1    Nov. 20, 2014

(51) Int. Cl.
| | |
|---|---|
| F16K 31/53 | (2006.01) |
| F16H 25/20 | (2006.01) |
| F16K 31/00 | (2006.01) |
| F16K 31/44 | (2006.01) |

(52) U.S. Cl.
CPC ............ *F16H 25/20* (2013.01); *F16K 31/00* (2013.01); *F16H 2025/2084* (2013.01); *F16H 2025/2093* (2013.01); *F16K 31/44* (2013.01); *F16K 31/53* (2013.01); *Y10T 74/18096* (2015.01)

(58) Field of Classification Search
CPC ............ F16H 25/20; F16H 2020/2084; F16H 2025/2093; Y10T 74/18096; F16K 31/00; F16K 31/44; F16K 31/53
USPC ........... 251/248–249.5, 250.5, 229, 266–268, 251/264, 273, 274, 214; 137/219
See application file for complete search history.

(56) References Cited

U.S. PATENT DOCUMENTS

| | | | | |
|---|---|---|---|---|
| 1,441,784 | A | * | 1/1923 | Clayton .................... 137/330 |
| 2,463,809 | A | * | 3/1949 | Sacchini ................... 251/229 |
| 2,513,650 | A | * | 7/1950 | Johnston .................. 137/219 |
| 2,536,836 | A | * | 1/1951 | Bowling ................... 251/229 |
| 2,742,254 | A | * | 4/1956 | Banker et al. ............... 251/16 |
| 2,745,294 | A |   | 5/1956 | Kron |
| 2,760,753 | A | * | 8/1956 | Guarnaschelli ........... 251/229 |
| 2,878,827 | A | * | 3/1959 | Johnson et al. ........... 137/219 |
| 2,963,260 | A |   | 12/1960 | Siravo |
| 3,227,174 | A | * | 1/1966 | Yost ......................... 137/375 |
| 3,596,679 | A |   | 8/1971 | Sugden, Jr. |
| 3,601,364 | A | * | 8/1971 | Scaramucci .............. 251/306 |
| 3,714,969 | A |   | 2/1973 | Hanning |
| 3,784,156 | A | * | 1/1974 | Paetzel et al. ............ 251/250 |
| 4,565,210 | A |   | 1/1986 | Heine et al. |
| 4,679,588 | A |   | 7/1987 | Raab et al. |

(Continued)

FOREIGN PATENT DOCUMENTS

| | | |
|---|---|---|
| JP | 5263951 A | 10/1993 |
| KR | 100645444 | 11/2006 |

*Primary Examiner* — Marina Tietjen
(74) *Attorney, Agent, or Firm* — Head, Johnson & Kachigian, P. C.

(57) ABSTRACT

A rotary-to-linear motion actuator having helical bevel gear and methods of use thereof are described. The actuator may be utilized with an apparatus for managing a fluid flow passage between one or more input ports and output ports. A pinion gear engages, and during operation turns, a bevel ring gear arranged on a helical path along an external periphery of a sleeve retaining a seat, which forms a fixed orifice. The teeth of the bevel gear are arranged on the helical path at the same pitch as external threads on the sleeve, which in turn, engage internal threads in an apparatus body. The area of the flow passage is changed by movement of the fixed seat orifice axially with respect to a contoured plug assembly. The threads of the sleeve and the body resist axial load imparted by the pressure drop across at the fixed orifice.

32 Claims, 12 Drawing Sheets

(56) References Cited

U.S. PATENT DOCUMENTS

| | | |
|---|---|---|
| 4,759,224 A | 7/1988 | Charbonneau et al. |
| 4,994,001 A | 2/1991 | Wilkinson et al. |
| 6,079,442 A | 6/2000 | Raymond, Jr. et al. |
| 6,443,422 B1 | 9/2002 | Gluf, Jr. |
| 6,471,184 B1 | 10/2002 | McIntosh |
| 6,772,783 B2 | 8/2004 | Etheridge |
| 2005/0211941 A1 | 9/2005 | LaVergne |
| 2011/0193001 A1* | 8/2011 | Farner ...................... 251/129.15 |

* cited by examiner

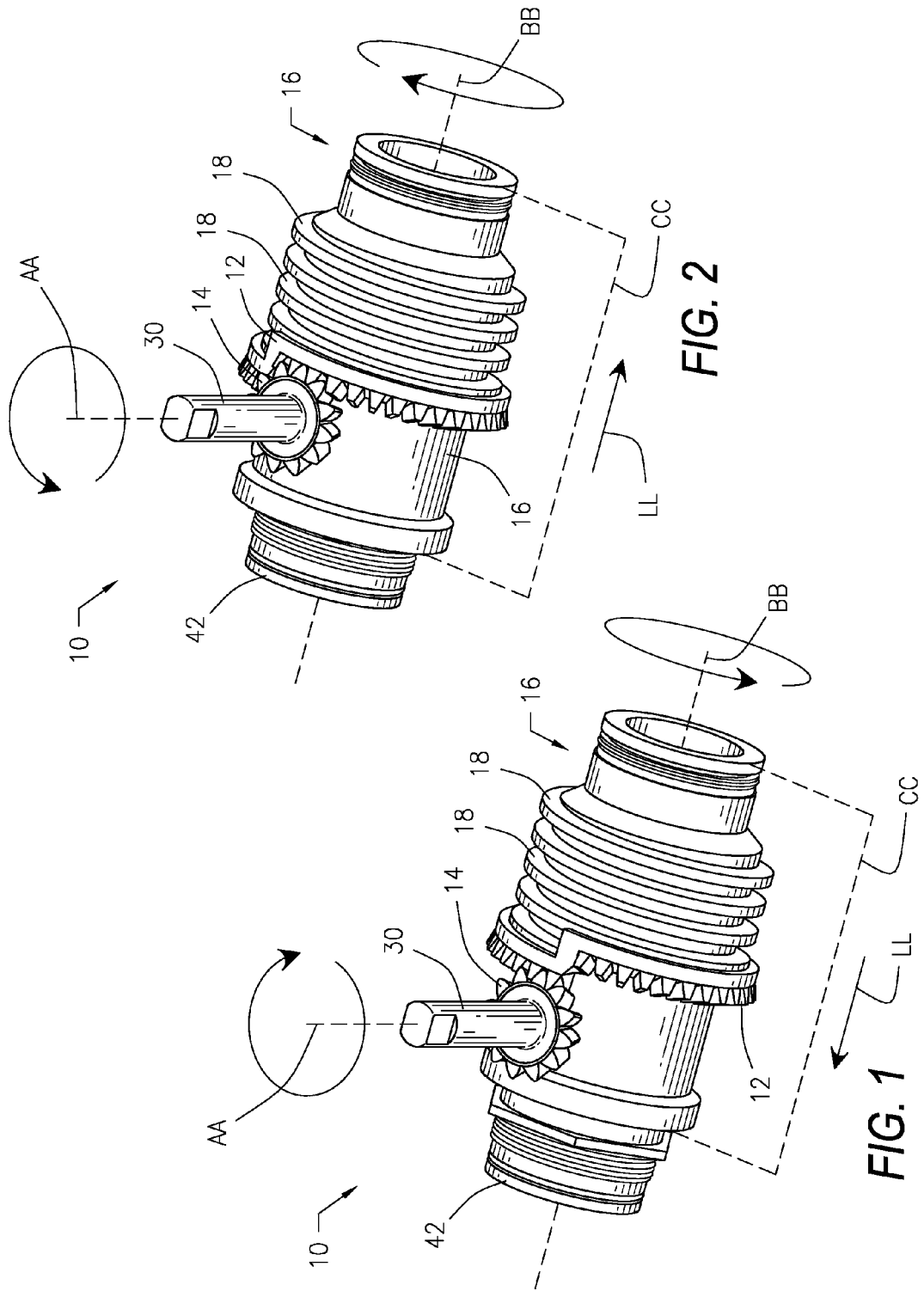

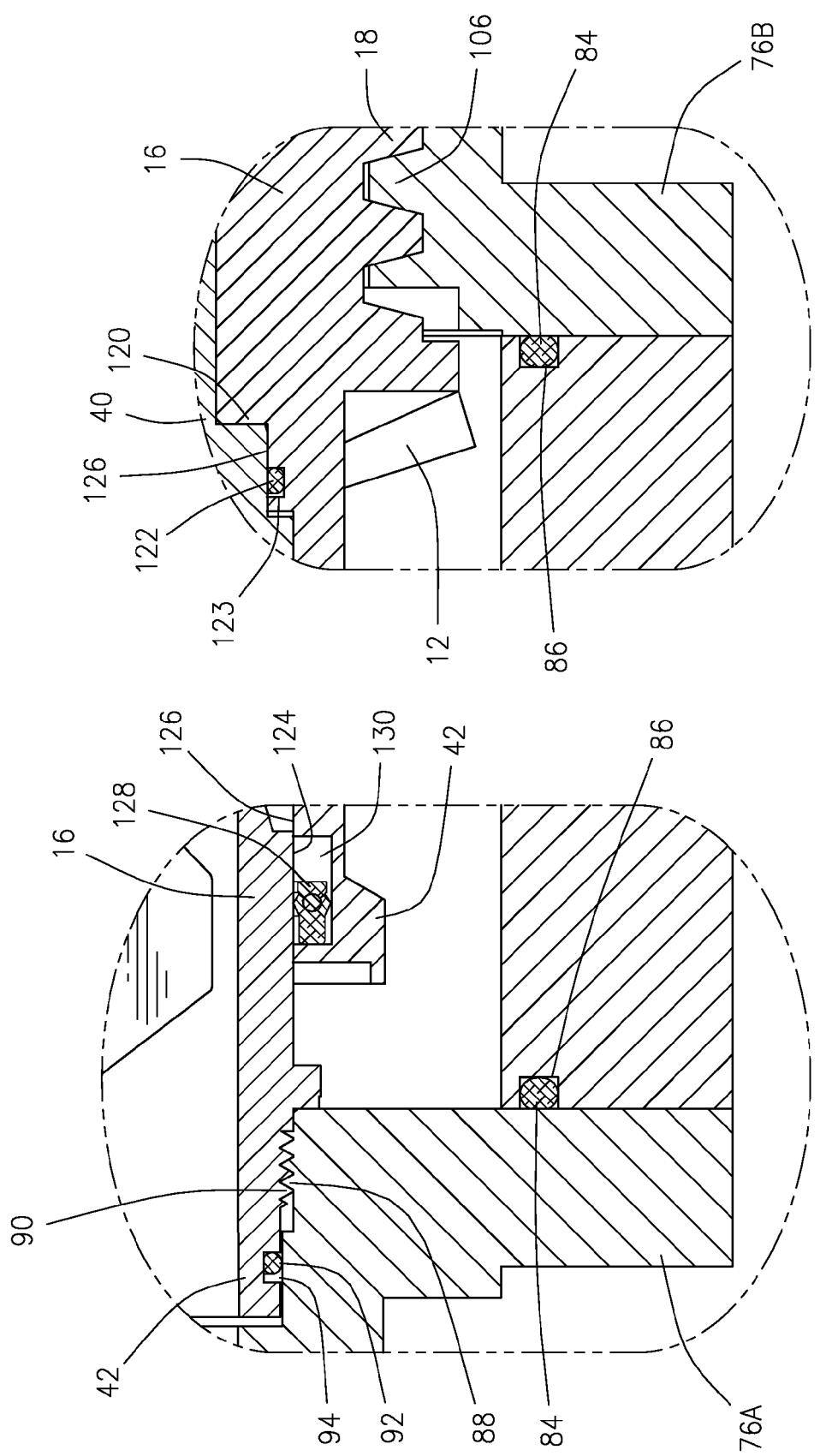

ROTARY-TO-LINEAR MOTION ACTUATOR HAVING A HELICAL BEVEL GEAR AND METHOD OF USE THEREOF

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates generally to a rotary-to-linear motion actuator having a helical bevel gear and methods of use thereof, and more particularly to a fluid flow apparatus having a helical bevel gear for controlling the flow of a fluid by means of changing the area of a flow passage.

2. Description of the Related Art.

When a fluid passes through a restricted passage, it gains speed in the area where the cross section is reduced. Since the energy, according to Bernouilli's law, is conserved, the rise in kinetic energy generates a drop in the pressure energy. The later then rises again when the flow passage cross section area rises again, thereby reducing the speed of the fluid.

The use of a purely mechanical apparatus in which a plug seals against a seat is very widely known, and can be used either to close off the flow altogether or adjust the flow of a fluid by movement of the plug away from the seat. Such a valve is not entirely suitable for use in controlling flows of potentially abrasive fluids, for example the liquids emerging from an oil well that may contain sand particles, as the particulate material will cause abrasion of the valve surfaces especially when the valve is almost closed. In addition, the pressure can locally drop by a large amount and reach values that are lower than the vaporization pressure of this liquid when the flow passage is restricted. When this happens, liquid can vaporize causing small gas bubbles to build up. The rise in pressure due to velocity decrease or contact with a surface then leads to an implosion of these bubbles, which is a highly energetic phenomenon in terms of pressure and temperature which can lead to the surrounding solid surface matter being abraded or torn apart. According to the extent of the cavitation phenomenon, the erosion taking place on the downstream surface of the body can be very quick and the destruction of the apparatus can take only a short amount of time. Consequently, when the apparatus is intended to be used in an application characterized by a large pressure difference, it is necessary to provide a valve that is adapted to withstand such a large pressure difference.

It is desirable to provide an actuator that converts rotary motion to linear motion by means of a bevel gear with teeth arranged on a helix of the same pitch as load bearing threads.

It is therefore further desirable to provide a fluid flow apparatus having a helical bevel gear for controlling the flow of a fluid by means of changing the area of the flow passage.

It is still further desirable to provide a fluid flow apparatus having a helical bevel gear that minimizes the disturbance of the fluid passing through the apparatus, thereby reducing the erosive effect on interior surfaces that force the fluid to change direction.

It is yet further desirable to provide a fluid flow apparatus having a helical bevel gear where the pressure drop through the flow passage is suitably distributed within the apparatus, so as to efficiently protect the apparatus against damage due to cavitation.

It is still yet further desirable to provide a fluid flow apparatus having a variable restriction orifice that is affected by rotating a stem in order to actuate a helical bevel gear to linearly move a contoured plug assembly in a direction normal to the plane of the orifice.

SUMMARY OF THE INVENTION

In general, in a first aspect, the invention relates to a rotary-to-linear motion actuator having a rotatable actuator body with a helical bevel ring gear. The actuator body also has external threads around an outer circumference thereof. The bevel ring gear has teeth arranged along a helical path about the circumference of the sleeve at the same pitch as the external threads on the sleeve. The actuator also includes a stemmed pinion gear engaged with the helical bevel gear affixed to the rotatable sleeve. Rotation motion of the pinion gear is transferred to rotational motion of the bevel ring gear about the helical path, and the rotation motion of the bevel ring gear about the helical path is transferred to linear movement of the sleeve along a path coincident with the center axis of the sleeve.

In general, in a second aspect, the invention relates to a fluid flow apparatus having a flow passage between one or more input ports and output ports. The fluid flow apparatus has a body having a stem receptacle for receipt of a stem assembly. The body has an internally threaded section, and the stem assembly includes a pinion gear. The apparatus also includes a sleeve having an externally threaded section engaged with the internally threaded section of the body. The sleeve has external bevel ring gear teeth arranged along a helical path about the sleeve at the same pitch as the external threads on the sleeve. The bevel ring gear is engaged with the pinion gear of the stem assembly. In addition, the apparatus includes a plug assembly having a contoured plug positioned within the flow passage. Moreover, the apparatus includes a seat having an orifice and being retained by the sleeve. The orifice of the seat is linearly movable toward the plug assembly, while the body, the sleeve, the seat and the plug assembly are axially aligned and coaxially spaced along.

The stem assembly can be constructed of a stem seal gland threadedly engaged with the body and a gland nut securing the stem seal gland to the body. The circular sealing assemblies may be positioned intermediate of annular sealing shoulders of the body and the stem seal gland. The body can include a gear cavity capable of being pressurized to balance forces on the sleeve from pressurized process fluid in the flow passage. In addition, the body can include opposing generally planar axial or open ends secured to hub end fittings. The hub end fittings are sealed with respect to the body by annular seal assemblies, such as elastomer or polymer seals, positioned within circular seal grooves defined in an outer periphery of the body. One of the end fittings may include the internally threaded section engaged with the externally threaded section of the sleeve and/or an internally threaded section engaged an externally threaded section of the plug assembly. The end fitting and the plug assembly can be sealed by annular seals or seal assemblies carried within a circular seal groove of the plug assembly. Moreover, another of the end fittings can include an internally threaded section engaged with the external threads on the sleeve.

The plug assembly of the apparatus can be constructed of a plug having a contoured end and a radially projecting finned end within an external, circular stop shoulder there between.

The extended plug of the plug assembly and the seat seal on an upstream surface of the contoured plug in order to close the flow passage of the apparatus.

Moreover, the external threads cause the sleeve to axially move along the flow passage as the sleeve rotates. The external threads of the sleeve and the internally threaded section are load-carrying and resist the axial load imparted by the pressure drop at the orifice of the seat. The external threads of the sleeve can terminate in an annular stop shoulder that engages with an outer periphery of one of the end fittings. Further, the sleeve can include stepped internal seat reliefs which receive the annular seat, and the seat may be sealed with respect to the seat reliefs by a circular sealing assembly, such as an elastomer and polymer seal, received within a circular seal groove of the sleeve. Furthermore, a first end fitting can be positioned upstream of a second end fitting along the flow passage and/or the plug can be positioned downstream of the orifice of the seat.

BRIEF DESCRIPTION OF THE DRAWINGS

FIG. 1 is a perspective view of an example of a rotary-to-linear motion actuator having helical bevel gear, where the actuator is in a first position, in accordance with an illustrative embodiment of the invention disclosed herein;

FIG. 2 is another perspective view of the actuator shown in FIG. 1, where the actuator is in a second position;

FIG. 12 is a cross-section view of area 12 of the apparatus as shown in FIG. 10;

FIG. 13 is a cross-section view of area 13 of the apparatus as shown in FIG. 10.

Figure 3:
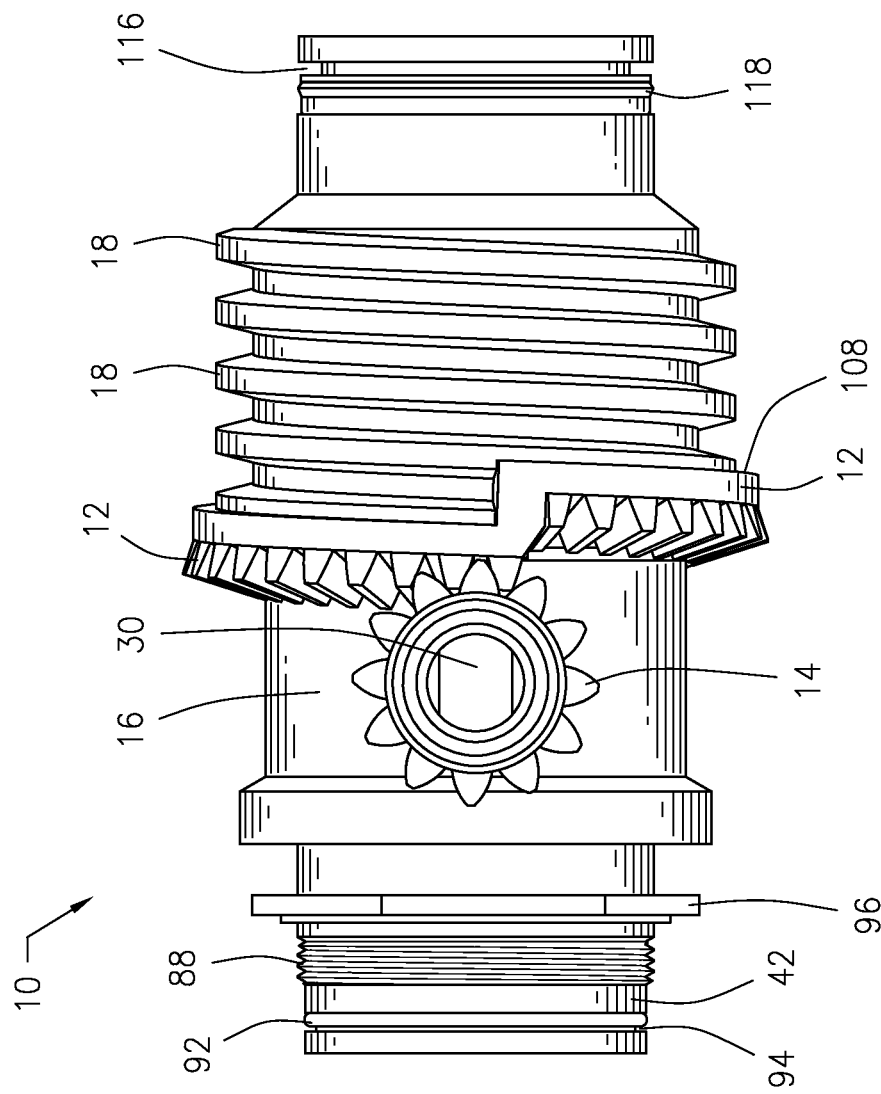
FIG. 3 is a top plan view of the actuator shown in FIG. 1.

Other advantages and features will be apparent from the following description, and from the claims.

DETAILED DESCRIPTION OF THE INVENTION

The devices and methods discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Referring to the figures of the drawings, wherein like numerals of reference designate like elements throughout the several views, and initially to FIGS. 1 through 3 whereby a generalized arrangement for the inventive rotary-to-linear motion actuator 10 having a helical bevel gear 12 is depicted. A stemmed pinion gear 14 engages the helical bevel ring gear 12 affixed to a rotatable sleeve 16. The teeth of the bevel gear 12 are arranged along a helical path about the circumference of the sleeve 16, and have the same pitch as external threads 18 on the sleeve 16. While the actuator 10 is shown as allowing for one full rotation, the helical path of the bevel gear 12 may have a pitch that would accommodate the pinion gear 14 diameter plus the width of a thread so that the bevel gear 12 could rotate more than one full turn. As such, the axial travel distance of the actuator 10 is governed by the length of the bevel gear 12 and the external threads 18 on the sleeve 16. As shown in FIG. 1, as the pinion gear 14 rotates in a first direction AA, the pinion gear 14 engages the bevel gear 12 and traverses the helical path, thereby causing the sleeve 16 to rotate about axis BB in the direction of the arrow and move linearly along path LL. As shown in FIG. 2, as the pinion gear 14 rotates in a second direction about axis AA, the pinion gear 14 moves back along the helical path and the sleeve 16 rotates in a second direction about axis BB and moves linearly back along path LL.

Figure 4:
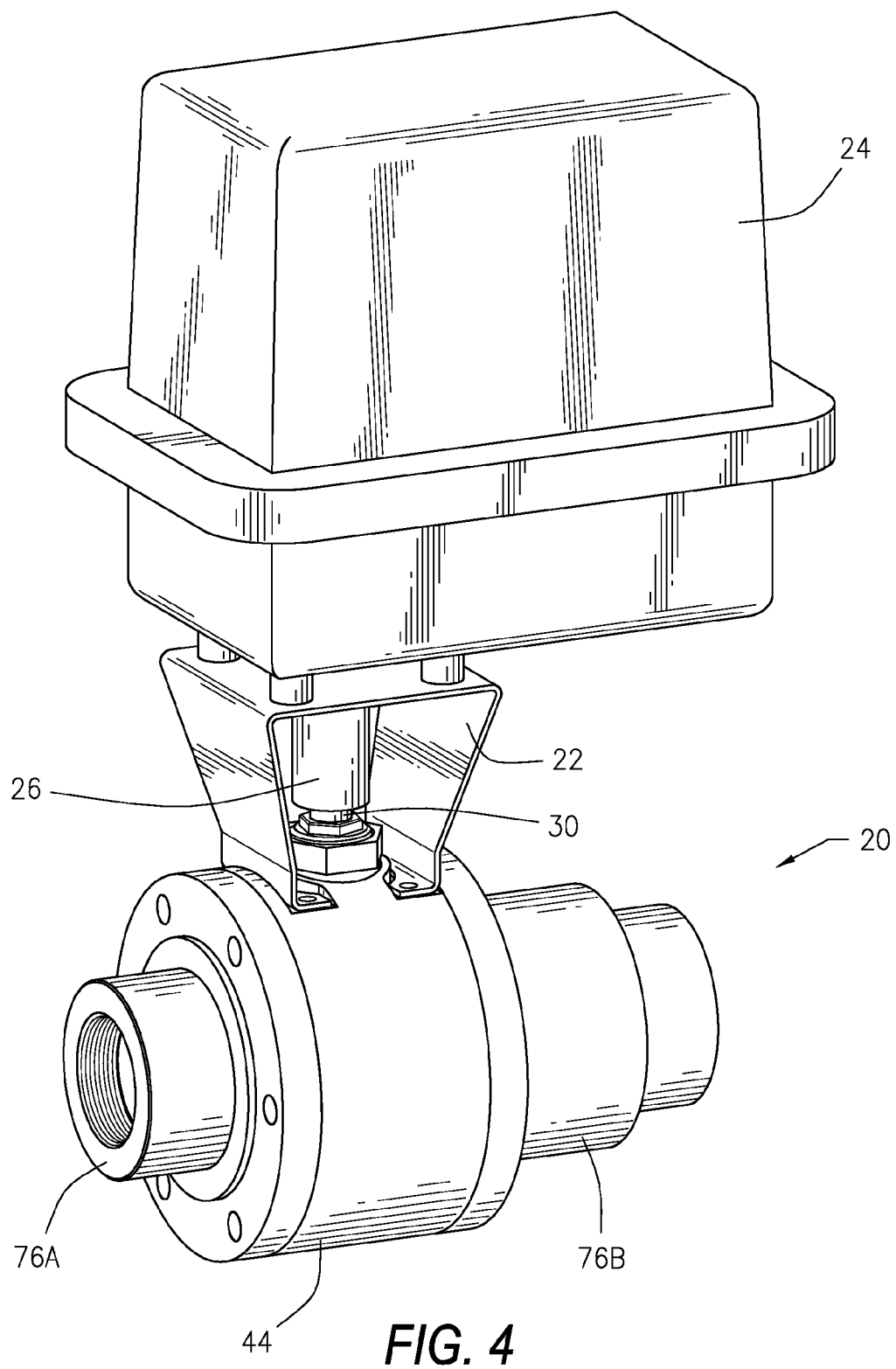
FIG. 4 is a perspective view of an example of a fluid flow apparatus in accordance with an illustrative embodiment of the rotary-to-linear motion actuator having helical bevel gear disclosed herein.
Figure 5:
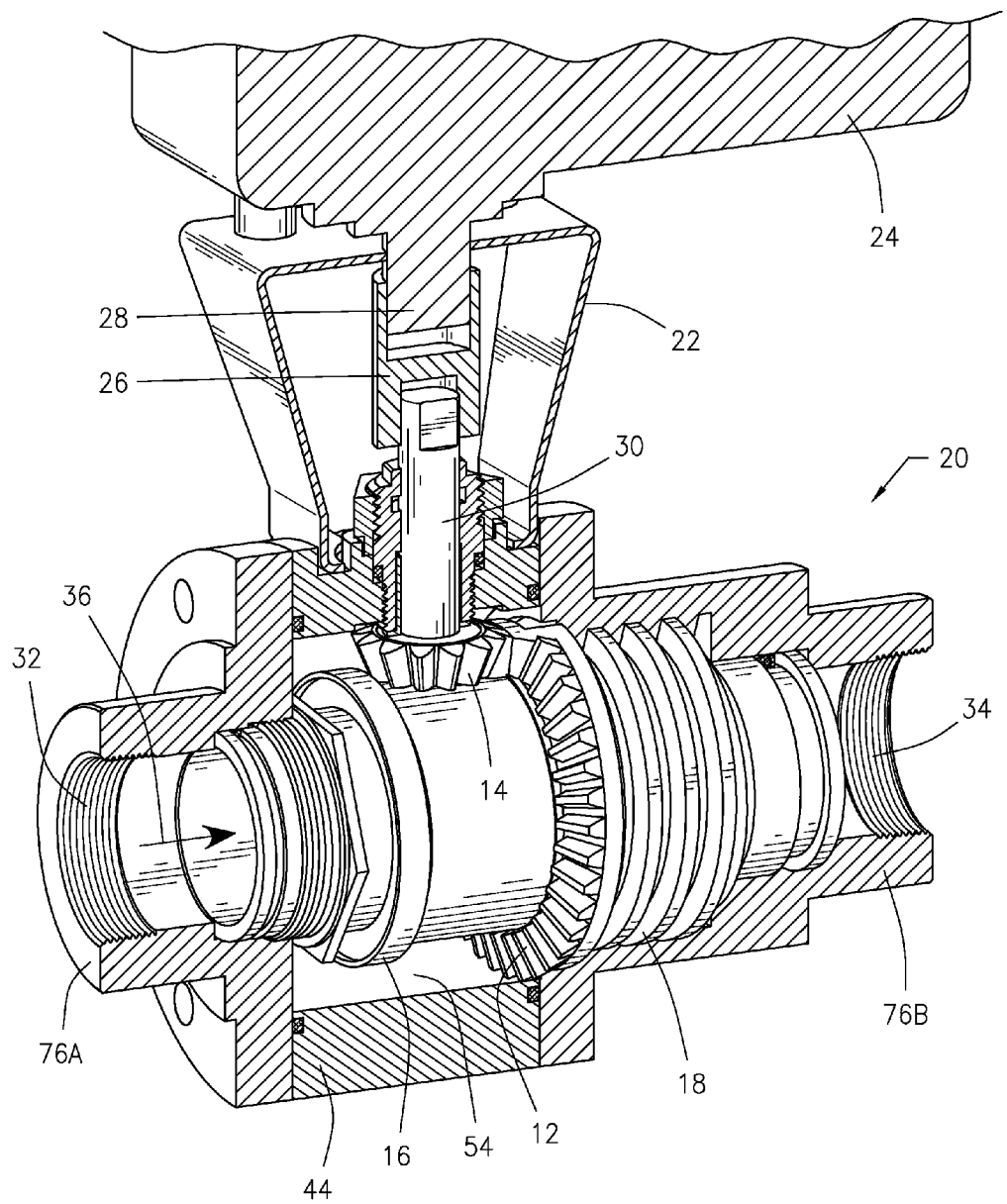
FIG. 5 is a partial cutaway view of the apparatus shown in FIG. 4.
Figure 6:
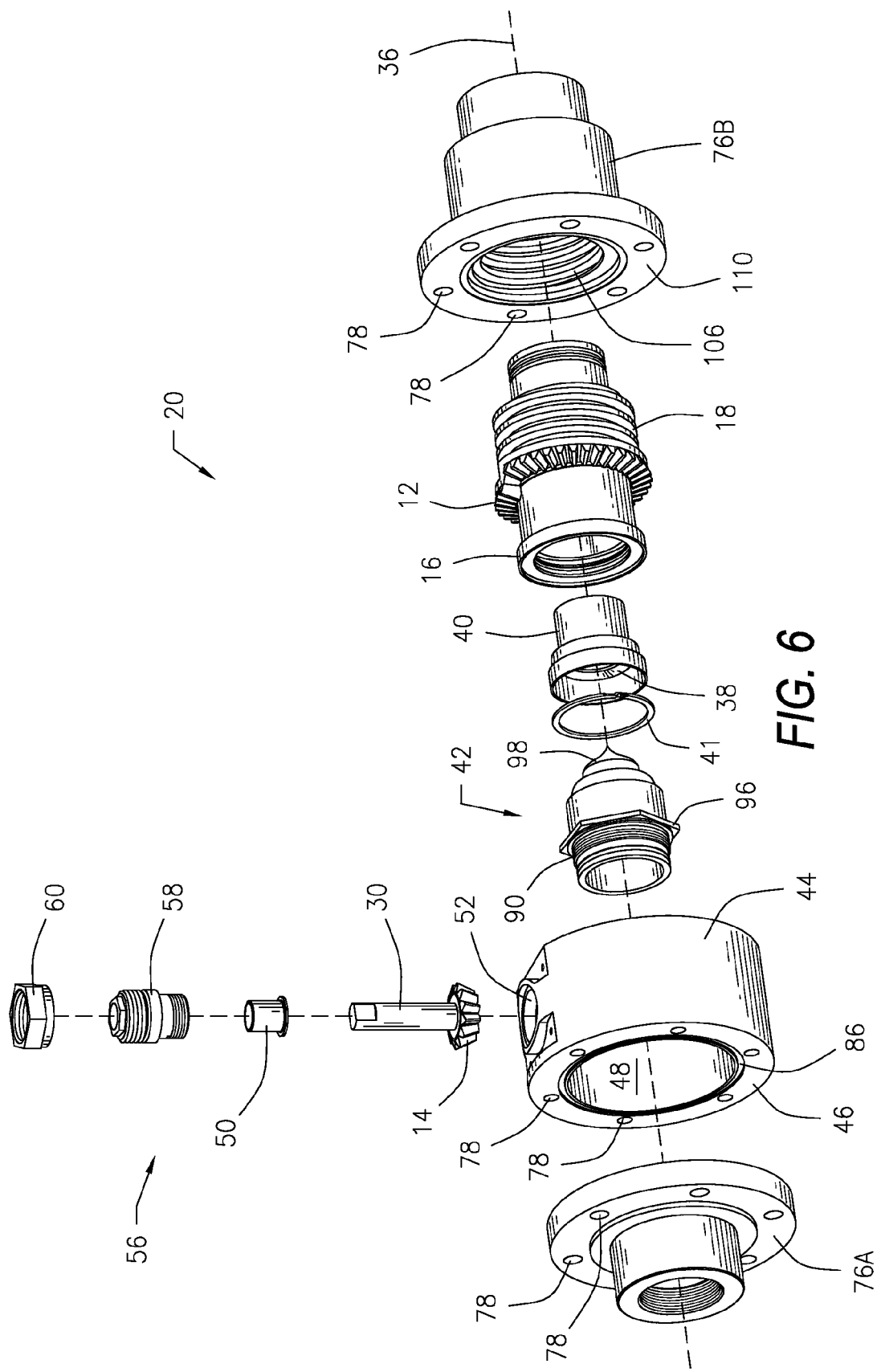
FIG. 6 is an exploded view of an example of a fluid flow apparatus in accordance with an illustrative embodiment of the rotary-to-linear motion actuator having helical bevel gear disclosed herein.
Figure 7:
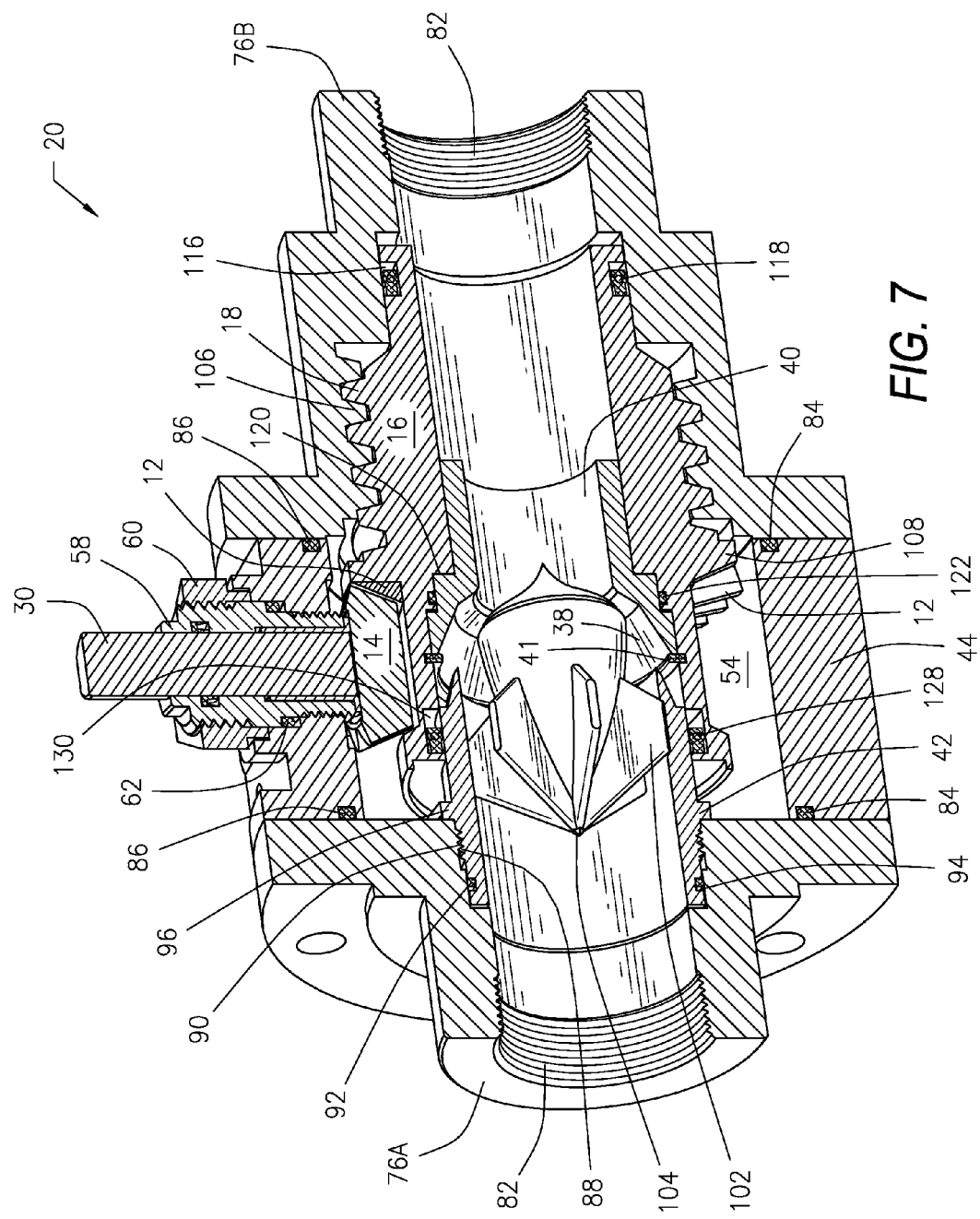
FIG. 7 is a perspective, partial cross-sectional view along line 6-6 of the apparatus shown in FIG. 5.
Figure 8:
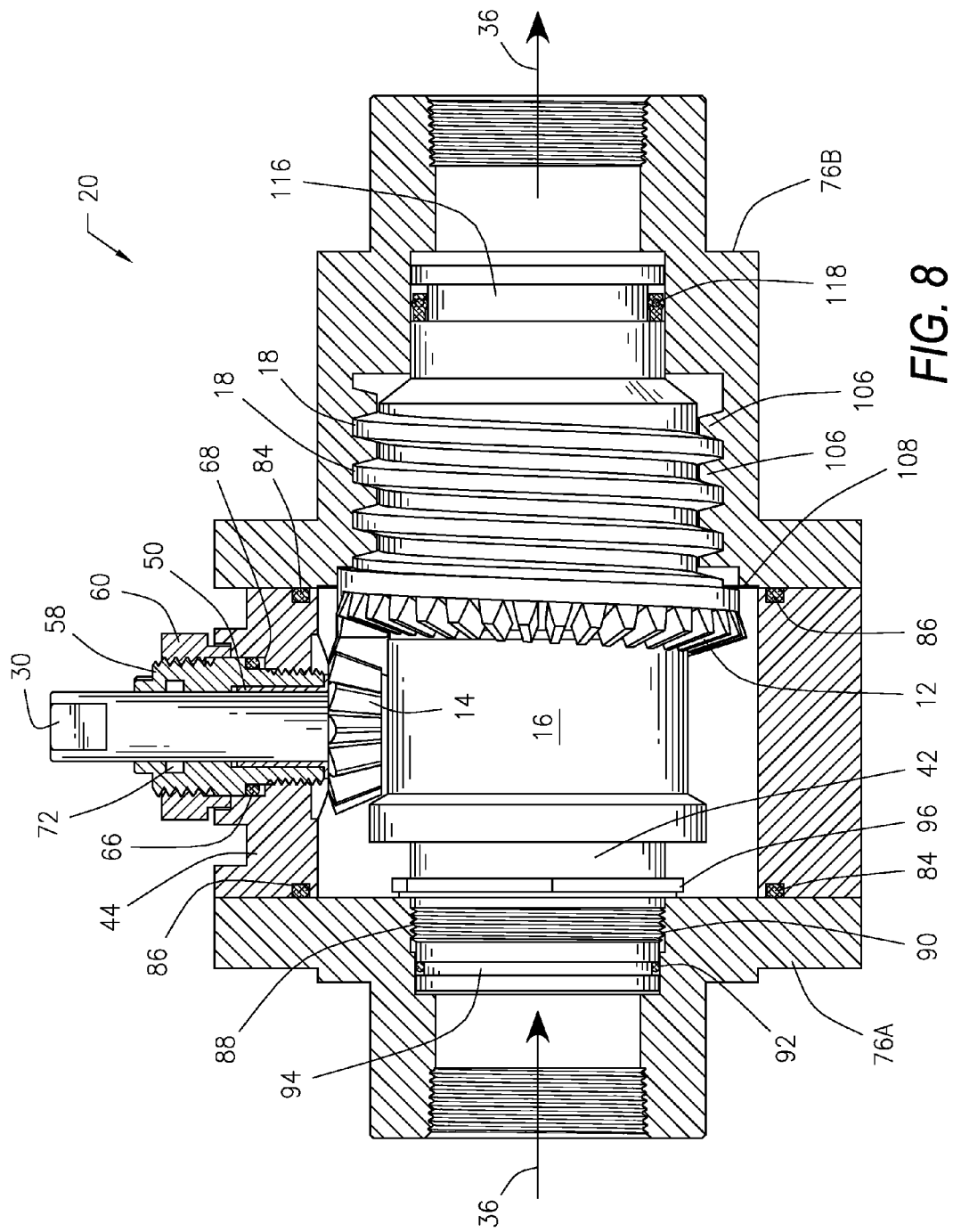
FIG. 8 is a side, partial cross-sectional view along line 6-6 of the apparatus shown in FIG. 5.
Figure 9:
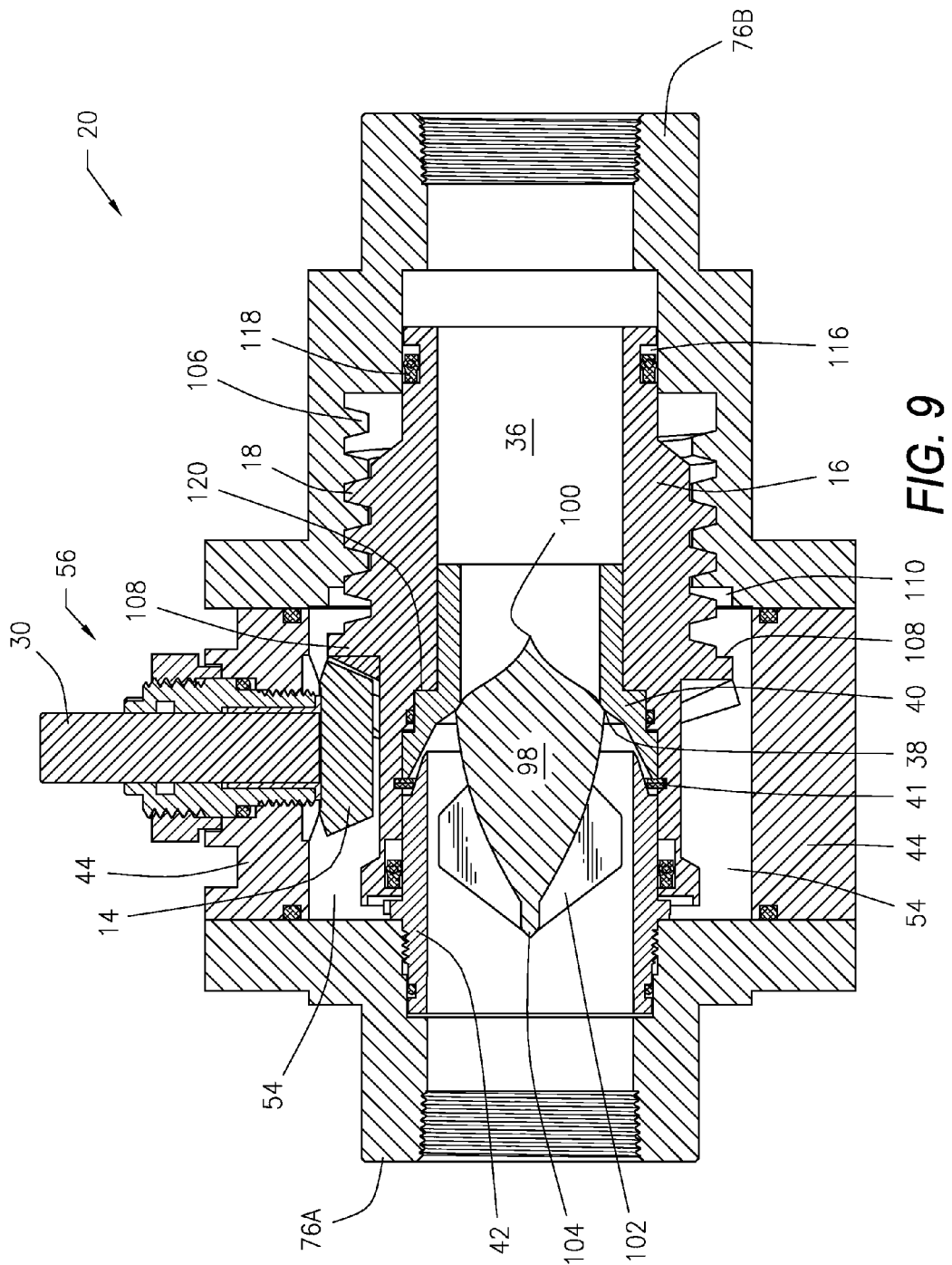
FIG. 9 is a cross-sectional view along line 6-6 of the apparatus shown in FIG. 5, where the apparatus is in a closed position.
Figure 10:
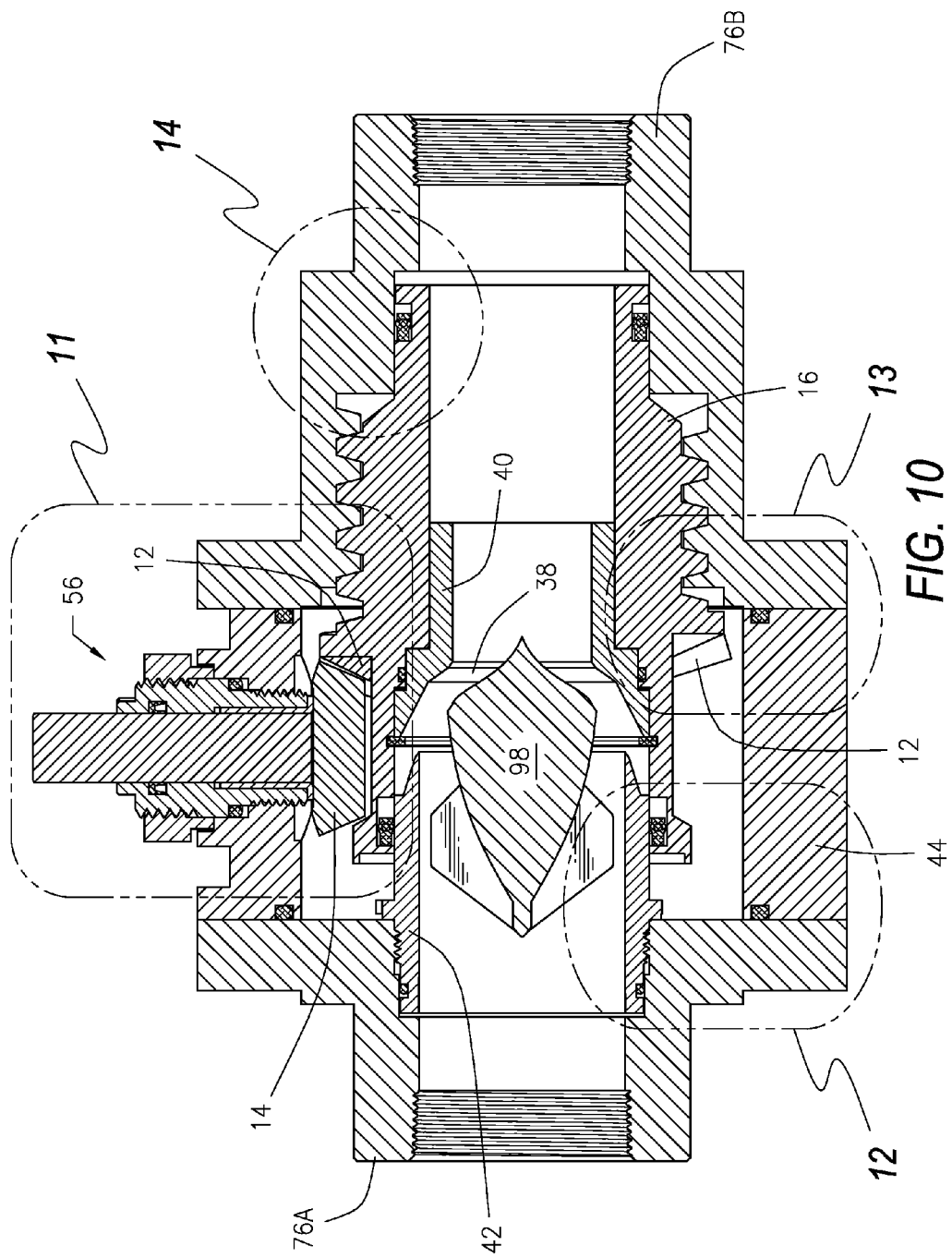
FIG. 10 is a cross-sectional view along line 6-6 of the apparatus shown in FIG. 5, where the apparatus is in an open position.
Figure 11:
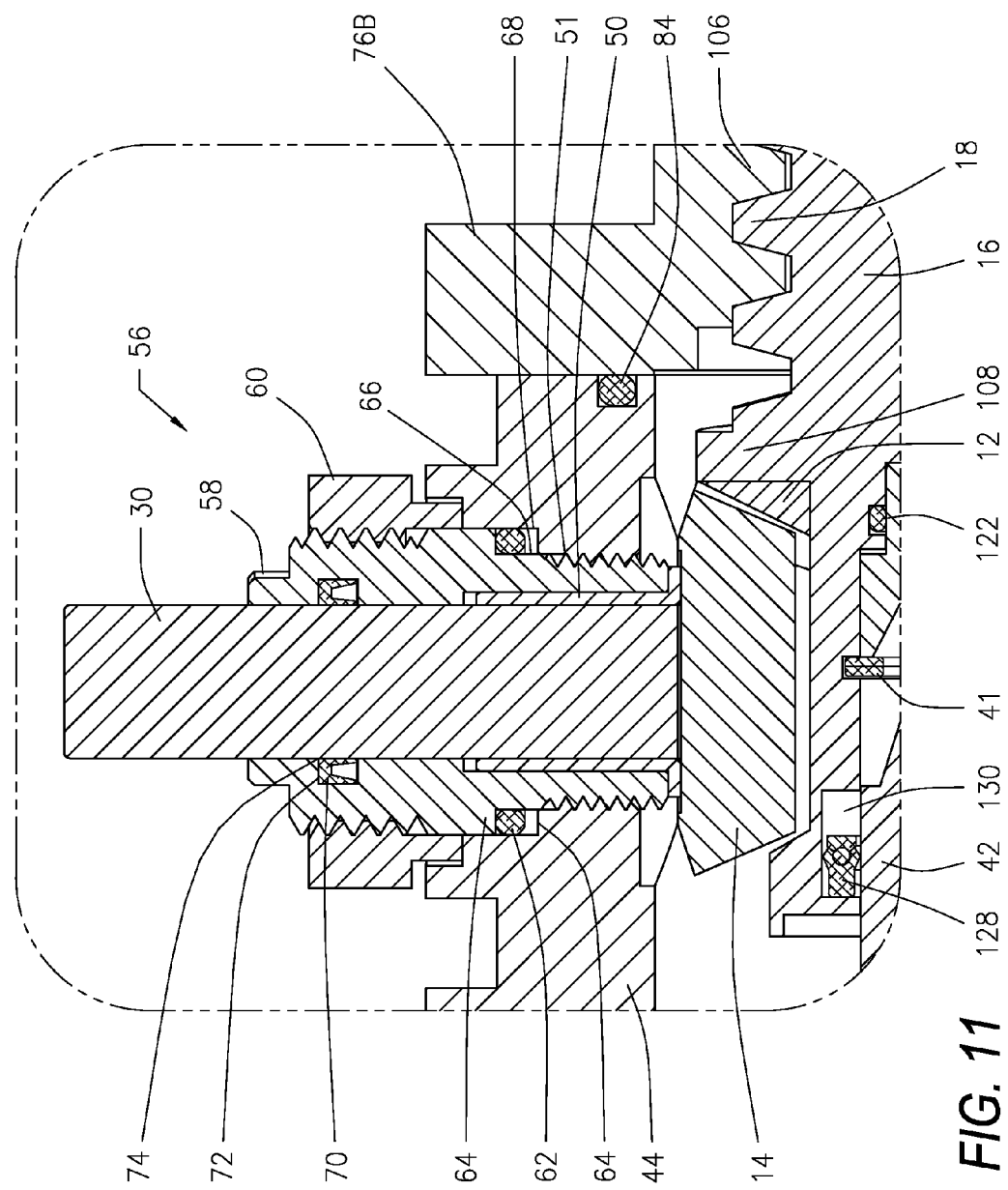
FIG. 11 is a cross-section view of area 11 of the apparatus as shown in FIG. 10.
Figure 14:
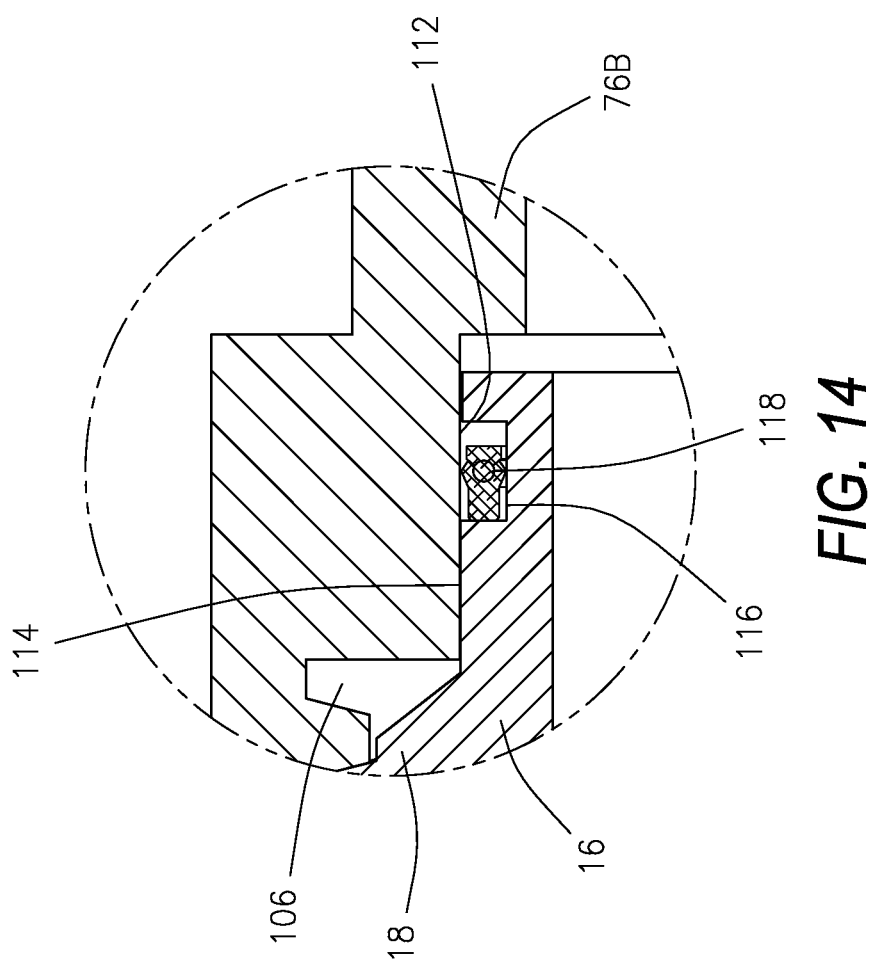
FIG. 14 is a cross-section view of area 14 of the apparatus shown in FIG. 10.

As shown in FIG. 3 the helical bevel ring gear 12 could be applied to any linear motion actuator, and for purposes of illustration rather than limitation herein is exemplified with a fluid flow apparatus. The actuator 10 should not be so limited, however, as the invention can be utilized in other embodiments. As shown in FIGS. 4 and 5, the fluid flow apparatus 20 can be a control valve or submersible pump pressure regulator for controlling the flow of a fluid by means of changing the area of a flow passage. An electric, rotary actuator 24 may be attached with a mounting bracket 22 to the fluid flow apparatus 20. The mounting bracket 22 is employed with a coupler 26 to join an output shaft 28 of the rotary actuator 24 to a stem 30 of the apparatus 20.

Referring now to FIGS. 5 through 13, in this example embodiment, the apparatus 20 manages fluid flow between one or more input ports 32 and output ports 34 using the helical bevel gear 12 to change the area of a flow passage 36 by moving an orifice 38 of a seat 40 axially with respect to a fixed, contoured plug assembly 42. As illustrated, the apparatus 20 includes a valve body 44 having opposing generally planar axial or open ends 46. The valve body 44 defines an internal valve chamber 48 and defines a first threaded bore 51 forming an actuating stem receptacle 52, which is in communication with a gear cavity 54. Lubricant within the gear cavity 54 of the valve body 44 may be pressurized to balance the force on the sleeve 16 from the process fluid under pressure to aid in closing the apparatus 20. To obtain sealing between the valve body 44 and the actuating stem 30, it may be appropriate to utilize a packing or stem sealing assembly 56. A stem seal gland 58 is threaded into the stem bore 51 in conjunction with a stem bearing 50, and a gland nut 60 secures the gland 58 to the valve body 44. The stem sealing assembly 56 allows for adjustment of the pinion gear 14 engagement with the bevel gear 12. The apparatus 20 is also provided with circular sealing elements or seal assemblies 62 located intermediate of annular shoulders 64 of the valve body 44 and the stem seal gland 58, which establish sealing engagement with an external cylindrical sealing surface 66 of the stem seal gland 58 and an internal cylindrical sealing surface 68 of the stem receptacle 52 in the valve body 44. An additional sealing element 70 may also be supported within a circular seal groove 72 of the stem seal gland 58 for sealing engagement with a cylindrical sealing surface 74 of the actuating stem 30.

The valve body 44 defines end openings 46 having opposing hub end fittings 76 secured thereto. The hub end fittings 76 and the valve body 44 include a plurality of axially aligned bolt openings 78 which receive bolts or threaded studs to secure the end fittings 76 to respective ends 46 of the valve body 44. As illustrated, the hub end fittings 76 can include internally threaded sections 82 that receive the externally threaded sections of a mating connection (not shown); however, the end fittings are not so limited and can be flanged or otherwise configured to match that of the mating connection. The hub end fittings 76 are sealed with respect to the valve body 44 by annular seals or seal assemblies 84. The seal assemblies 84 can be carried within circular seal grooves 86 defined in the outer periphery of ends 46 of the valve body 44. The annular seals or seal assemblies 84 may be elastomer or polymer seals that provide sealing within a normal operating temperature range.

A first end fitting 76A may include an internally threaded section 88 that receives an externally threaded section 90 of the plug assembly 42. In addition to the threaded engagement, the first end fitting 76A and the plug assembly 42 are sealed by annular seals or seal assemblies 92. The seals 92 can be carried within a circular seal groove 94 near an end of the plug assembly 42. The plug assembly 42 may define an external, circular stop shoulder 96 that may provide a metal-to-metal engagement by threading it into the first end fitting 76A to its fully seated position. A plug 98 is fixed within the plug assembly 42 along the flow passage 36, and is contoured on a first end 100 and has a plurality of radially projection support fins 102 on a second end 104. The extended plug 98 of the plug assembly 42 of the apparatus 20 and the seat 40 seal on the upstream surface of the plug 98 contour in order to close the flow passage of the apparatus 20.

A second end fitting 76B includes an internally threaded section 106 to receive the external threads 18 on a sleeve 16, which is engaged with the seat 40. The external threads 18 cause the sleeve 16 to axially move along the flow passage 36 through the valve body 44 as the sleeve 16 rotates. The external threads 18 of the sleeve 16 and the internally threaded section 106 of the second end fitting 76B are load-carrying and resist the axial load imparted by the pressure drop at the fixed orifice 38 of the seat 40. The external threads 18 of the sleeve 16 terminate in an annular shoulder 108 that engage with an outer periphery of a relief 110 of the second end fitting 76B. As discussed inter alia, the bevel ring gear 12 is arranged along a helical path about the outer circumference of the sleeve 16 and has the same pitch as the external threads 18 on the sleeve 16. Moreover, an internal sealing surface 112 of the second end fitting 76B may be sealed with respect to an external sealing surface 114 of the sleeve 16. A circular seal groove 116 on the external sealing surface 114 of the sleeve 16 may receive an annular sealing assembly 118. The sealing assembly 118 may be a bi-direction dynamic seal that isolates the processing fluid from lubricant within the gear cavity 54 of the valve body 44.

The seat 40 is configured to be positioned internally of the sleeve 16 along the flow passage 36 and secured by retainers 41. The sleeve 16 defines stepped internal seat reliefs 120 within which receive the annular seat 40. The seat 40 is sealed with respect to the seat reliefs 120 by a circular sealing assembly 122, which may be received within a circular seal groove 123 of the sleeve 16. The circular sealing assembly 122 establishes sealing within an external sealing surface 126 which is defined by the outer periphery of the seat 40. The circular sealing assemblies 122 can be constructed from elastomer and polymer materials capable of accomplishing effective sealing at normal operating temperatures and at all pressure ranges.

In addition, an internal sealing surface 126 of the sleeve 16 may be sealed with respect to an external sealing surface 124 of the plug assembly 42 by an annular sealing assembly 128. The annular sealing assembly 128 may be a bi-directional dynamic seal positioned within a circular seal groove 130 on the internal sealing surface 126 of the sleeve 16. The dynamic seal 128 isolates fluid in the flow passage 36 from lubricant in the gear cavity 54 of the valve body 44.

As illustrated, the plug assembly 42, the seat 40 and the sleeve 16 are axially aligned and co-axially spaced. In addition, the example embodiment of the apparatus 20 is illustrated with the first end fitting 76A positioned upstream of the second end fitting 76B along the flow passage 36, but the invention should not be so limited; the second end fitting 76B may be positioned upstream of the first end fitting 76A along the flow passage 36 in keeping with the scope of the invention. Moreover, the plug 98 may be positioned downstream of the orifice 38 edge of the seat 40 to permit the pressure drop induced axial load on the sleeve 16 to aid during closure of the flow passage 36. Further, the load-bearing threads 18 of the sleeve 16 could be upstream of the valve seat 40.

The valve body 44 and hub end fittings 76 may be fabricated from forged or wrought material complying with industry standards for the intended usage. The plug assembly 42, the sleeve 16 and/or the stem 30 can be fabricated from investment cast precipitation-hardening corrosion-resistant steel, and erosion prone surfaces near the annulus between the downstream surface of the plug 98 and the orifice 38 of the seat 40 can be lined with tungsten carbide. Erosion and corrosion-resistant materials may be applied as required to accompany application severity. In addition to the seals and seal assemblies discussed herein, the invention may utilize additional wear rings, gaskets and/or sleeves can be applied to the contoured end 100 of the plug 98, the surfaces of the seat 40 along the flow passage 36 and/or other areas downstream of the seat 40. The foregoing materials are merely examples that may be utilized in constructing the apparatus 20 and other materials may be employed to suit the particular usage of the apparatus 20.

During operation, fluid passes through the annulus between the downstream surface of the plug 98 and the orifice 38 edge of the seat 40, and the annulus area changes with axial movement of the sleeve 16, thereby forming a variable restriction orifice 38. The area of the flow passage 36 is changed by movement of the seat orifice 38 axially with respect to the contoured plug 98. In particular, rotation of the valve stem 30 turns the pinion gear 14 that engages and turns the bevel ring gear 12 affixed to the sleeve 16 fixing the variable restriction orifice 38 of the seat 40. The teeth of the bevel ring gear 12 are arranged on a helical path of the same pitch as the external threads 18 on the sleeve 16, which engage with the internal threaded section 106 in the downstream hub 76B. The threads 18 and 106 of the sleeve 16 and the downstream hub 76B resist axial load imparted by the pressure drop across the plug 98.

Whereas, the devices and methods have been described in relation to the drawings and claims, it should be understood that other and further modifications, apart from those shown or suggested herein, may be made within the spirit and scope of this invention.

What is claimed is:

1. A rotary-to-linear motion actuator, comprising:
a rotatable actuator sleeve having a helical bevel ring gear and external threads around an outer circumference of said rotatable actuator sleeve, said helical bevel ring gear arranged along a helical path about said outer circumference of said rotatable actuator sleeve at a same pitch as said external threads on said rotatable actuator sleeve; and
a stemmed pinion gear engaged with said helical bevel ring gear affixed to said rotatable actuator sleeve;
wherein rotation motion of said stemmed pinion gear is transferred to rotational motion of said helical bevel ring gear about said helical path, wherein said rotation motion of said helical bevel ring gear about said helical path is transferred to linear movement of said rotatable actuator sleeve along a path.

2. The actuator of claim 1 wherein said rotatable actuator sleeve further comprises stepped internal seat reliefs.

3. The actuator of claim 2 further comprising a circular sealing assembly received within a circular seal groove of said rotatable actuator sleeve.

4. The actuator of claim 3 wherein said circular sealing assembly is an elastomer and polymer seal.

5. The actuator of claim 1 wherein said rotatable actuator sleeve further comprises an internal sealing surface having a circular seal groove.

6. The actuator of claim 5 further comprising an annular sealing assembly positioned within said circular seal groove of said internal sealing surface of said rotatable actuator sleeve.

7. The actuator of claim 6 wherein said annular sealing assembly is a bi-directional dynamic seal.

8. The actuator of claim 1 further comprising an annular shoulder intermediate of said external threads and said helical bevel ring gear of said rotatable actuator sleeve.

9. The actuator of claim 1 wherein said rotatable actuator sleeve further comprises an external sealing surface having a circular sealing groove.

10. The actuator of claim 9 further comprising an annular sealing assembly received within said circular seal groove on said external sealing surface of said rotatable actuator sleeve.

11. The actuator of claim 10 wherein said annular sealing assembly is a bi-directional dynamic seal.

12. A fluid flow apparatus having a flow passage between one or more input ports and output ports, said fluid flow apparatus comprising:
a body having a stem receptacle for receipt of a stem assembly, said body having an internally threaded section, said stem assembly comprising a pinion gear;
a rotatable sleeve having an externally threaded section engaged with said internally threaded section of said body, said sleeve having an external helical bevel ring gear arranged along a helical path about said sleeve at a same pitch as external threads of said externally threaded section on said sleeve, said external helical bevel ring gear engaged with said pinion gear of said stem assembly;
a plug assembly comprising a contoured plug positioned within said flow passage; and
a seat having an orifice, said seat retained by said sleeve, wherein said orifice of said seat is linearly movable toward said plug assembly;
wherein said body, said sleeve, said seat and said plug assembly are axially aligned and coaxially spaced along.

13. The apparatus of claim 12 wherein said stem assembly further comprises a stem seal gland threadedly engaged with said body and secured to said body by a gland nut.

14. The apparatus of claim 13 further comprising circular sealing assemblies positioned intermediate of annular sealing shoulders of said body and said stem seal gland.

15. The apparatus of claim 12 wherein said body further comprises a gear cavity capable of being pressurized to balance forces on said sleeve from pressurized process fluid in said flow passage.

16. The apparatus of claim 12 wherein said body further comprising opposing generally planar axial or open ends secured to hub end fittings.

17. The apparatus of claim 16 wherein said hub end fitting are sealed with respect to said body by annular seal assemblies positioned within circular seal grooves defined in an outer periphery of said body.

18. The apparatus of claim 17 wherein said seal assemblies are elastomer or polymer seals.

19. The apparatus of claim 16 wherein one of said end fitting includes said internally threaded section engaged with said externally threaded section of said sleeve.

20. The apparatus of claim 16 wherein an externally threaded section of said plug assembly engages an internally threaded section of one of said end fittings.

21. The apparatus of claim 16 wherein said end fitting and said plug assembly are sealed by annular seals or seal assemblies carried within a circular seal groove of said plug assembly.

22. The apparatus of claim 16 wherein another of said end fittings includes an internally threaded section engaged with said external threads on said sleeve.

23. The apparatus of claim 16 wherein said external threads of the sleeve and said internally threaded section are load-carrying and resist the axial load imparted by the pressure drop at said orifice of said seat.

24. The apparatus of claim 16 wherein said external threads of said sleeve terminate in an annular stop shoulder that engage with an outer periphery of one of said end fittings.

25. The apparatus of claim 16 wherein a first end fitting is positioned upstream of a second end fitting along said flow passage.

26. The apparatus of claim 12 wherein said plug assembly further comprises an extended plug having a contoured end and a radially projecting finned end.

27. The apparatus of claim 26 wherein said extended plug of the plug assembly and said seat seal on an upstream surface of said contoured plug in order to close said flow passage of the apparatus.

28. The apparatus of claim 12 wherein said external threads cause said sleeve to axially move along said flow passage as said sleeve rotates.

29. The apparatus of claim 12 wherein said sleeve further comprises stepped internal seat reliefs which receive said annular seat.

30. The apparatus of claim 29 wherein said seat is sealed with respect to said seat reliefs by a circular sealing assembly received within a circular seal groove of said sleeve.

31. The apparatus of claim 30 wherein said circular sealing assembly is an elastomer and polymer seal.

32. The apparatus of claim 12 wherein said plug is positioned downstream of said orifice of said seat.

* * * * *